(12) United States Patent
Matsuda

(10) Patent No.: US 10,670,412 B2
(45) Date of Patent: Jun. 2, 2020

(54) SYSTEM AND METHOD FOR GENERATING A TARGET PATH FOR A VEHICLE

(71) Applicant: VEONEER US, INC., Southfield, MI (US)

(72) Inventor: Takuro Matsuda, Farmington Hills, MI (US)

(73) Assignee: VEONEER US, INC., Southfield, MI (US)

( * ) Notice: Subject to any disclaimer, the term of this patent is extended or adjusted under 35 U.S.C. 154(b) by 166 days.

(21) Appl. No.: 15/900,235

(22) Filed: Feb. 20, 2018

(65) Prior Publication Data

US 2019/0257664 A1 Aug. 22, 2019

(51) Int. Cl.
*G01C 21/34* (2006.01)
*G05D 1/02* (2020.01)

(52) U.S. Cl.
CPC ....... *G01C 21/3453* (2013.01); *G05D 1/0212* (2013.01); *G05D 1/0231* (2013.01); *G05D 1/0246* (2013.01); *G05D 1/0255* (2013.01); *G05D 1/0257* (2013.01)

(58) Field of Classification Search
CPC ............. G01C 21/3453; G05D 1/0212; G05D 1/0231; G05D 1/0246; G05D 1/0255; G05D 1/0257
See application file for complete search history.

(56) References Cited

U.S. PATENT DOCUMENTS

| 8,630,791 | B2 * | 1/2014 | Yuasa | ................ G01C 21/3469 340/995.19 |
| 9,053,433 | B2 * | 6/2015 | Will | ...................... B60W 40/06 |
| 2005/0216181 | A1 * | 9/2005 | Estkowski | ............. G01C 21/20 701/411 |
| 2010/0076640 | A1 * | 3/2010 | Maekawa | ............ G05D 1/0217 701/26 |
| 2015/0094945 | A1 * | 4/2015 | Cheng | ..................... G01C 21/34 701/408 |
| 2015/0353082 | A1 * | 12/2015 | Lee | ........................ B60W 30/09 701/41 |
| 2019/0086925 | A1 * | 3/2019 | Fan | ...................... G05D 1/0212 |

(Continued)

FOREIGN PATENT DOCUMENTS

| CN | 102609765 | A | 7/2012 |
| CN | 106444738 | A | 2/2017 |
| CN | 106671982 | A | 5/2017 |

OTHER PUBLICATIONS

International Search Report for International Application No. PCT/US2019/017436, dated Apr. 29, 2019, 2 pgs.

*Primary Examiner* — Courtney D Heinle
(74) *Attorney, Agent, or Firm* — Dickinson Wright PLLC

(57) ABSTRACT

A system and method for generating a target path for a vehicle and controlling the movement of the vehicle includes a processor and a control system in communication with the processor. The control system is configured to control the movement of the vehicle. The processor is configured to determine a target path, determine a cost of the target path using a cost function, wherein the cost function utilizes a criteria that comprises a smoothness of the target path, determine a constraint that the target path is allowed to exist within, and optimize the target path for the vehicle by reducing the cost of the target path using the cost function and the constraint in which the target path is allowed to exist within.

16 Claims, 13 Drawing Sheets

(56) References Cited

U.S. PATENT DOCUMENTS

2019/0086930 A1* 3/2019 Fan ..................... G05D 1/0223
2019/0086932 A1* 3/2019 Fan ..................... G05D 1/0246
2019/0286154 A1* 9/2019 Shalev-Shwartz .........................
                                                G05D 1/0231

* cited by examiner

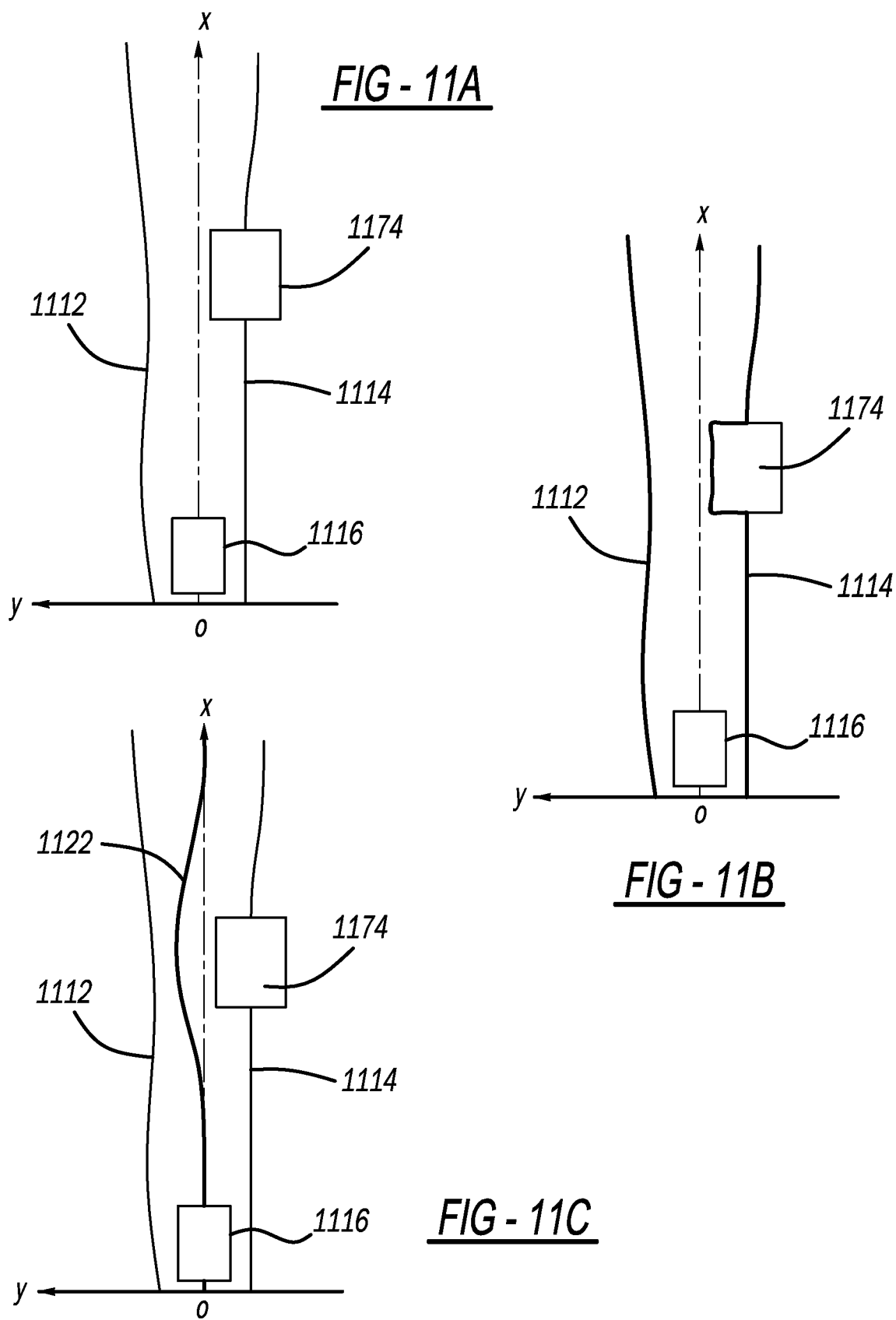

SYSTEM AND METHOD FOR GENERATING A TARGET PATH FOR A VEHICLE

BACKGROUND

1. Field of the Invention

The present invention generally relates systems and methods for generating a target path for a vehicle.

2. Description of Related Art

In the past, vehicles needed a driver or operator to make sure the vehicle travels correctly between locations. This has been true throughout history, wherein vehicles, even those pulled by animals, need to be guided by a human operator to ensure that they were traveling correctly from one place to another. In the case of automobiles, a human driver or operator drives or pilots the automobile between two separate places by utilizing a steering wheel to control the direction of the automobile and one or more pedals to control the forward/rearward movement of the automobile.

One recent development in automobiles relates to autonomous vehicles. Automobiles have been provided with certain features to assist the human driver with driving the automobile. For example, the development of antilock braking systems allowed the brake system of the vehicle to actuate the brakes far faster than a human operator could ever do. By so doing, the stopping distance of the automobile, especially in inclement weather, was improved.

Additionally, there have been other driver-assisted systems that have been developed and incorporated into modern automobiles. Some of these systems relate to the use of sensors that can detect objects exterior to the vehicle. Based on the automobile's approach to these objects, these safety systems can provide input to the driver indicating that the driver is rapidly approaching these objects and inform the driver to take corrective action. Even more advanced systems can take control of the braking and/or steering of an automobile to prevent contact with the object altogether.

Now, autonomous automobiles are being developed that are capable of sensing the environment around the vehicle and navigating the vehicle with minimal or no human input. These autonomous vehicles may utilize a variety of techniques to detect their surroundings, such as radar, lasers, Global Positioning Systems ("GPS"), odometry and computer vision. However, the way information is collected, interpreted, and utilized to pilot the automobile is still rather rudimentary.

SUMMARY

One general aspect includes a method for generating a target path for a vehicle. The target path substantially follows a direction the vehicle intends to travel. The method includes the steps of determining a target path, determining a cost of the target path using a cost function, determining a constraint that the target path is allowed to exist within, and optimizing the target path for the vehicle. The optimized target path may be based on reducing the cost of the target path using the cost function and the constraint in which the target path is allowed to exist within. It should be understood that this method might be executed iteratively. More simply, the method may be executed numerous times, over and over again, to continue the optimization to create the most optimized target path.

The cost function may utilize a criterion or criteria that includes a smoothness of the target path. The smoothness of the target path may be based on a magnitude of a curvature of the target path or a change or the curvature of the target path. Additionally, the cost function may utilize additional criteria such as closeness to a center of the target path and length of the target path. Generally, the cost may be increased by the cost function based on (a) when the smoothness of the target path decreases, (b) when the closeness to the center of the target path decreases, or (c) when the length of the target path increases.

The constraint may include a distance from a reference point on the target path to a right boundary and a left boundary, wherein the distance is substantially perpendicular to the target path at the reference point. More than one constraint may be utilized. For example, the constraint could include objects located between the right boundary and the left boundary that the vehicle wishes to avoid.

As to the system, the system generally includes a processor and a vehicle control device in communication with the processor. The vehicle control device controls the movement of the vehicle based on instructions received from the processor. The processor is configured to execute the method steps previously disclosed above to generate a target path for the vehicle. To those ends, the processor is configured to determine a target path, determine a cost of the target path using a cost function, determine a constraint that the target path is allowed to exist within, and optimize the target path for the vehicle.

Further objects, features, and advantages of this invention will become readily apparent to persons skilled in the art after a review of the following description, drawings and claims that are appended to and form a part of this specification.

BRIEF DESCRIPTION OF THE DRAWINGS

FIGS. 11A-11C illustrate examples of determining a constraint in which the vehicle is allowed to operate within wherein an object is considered.

DETAILED DESCRIPTION

Figure 1:
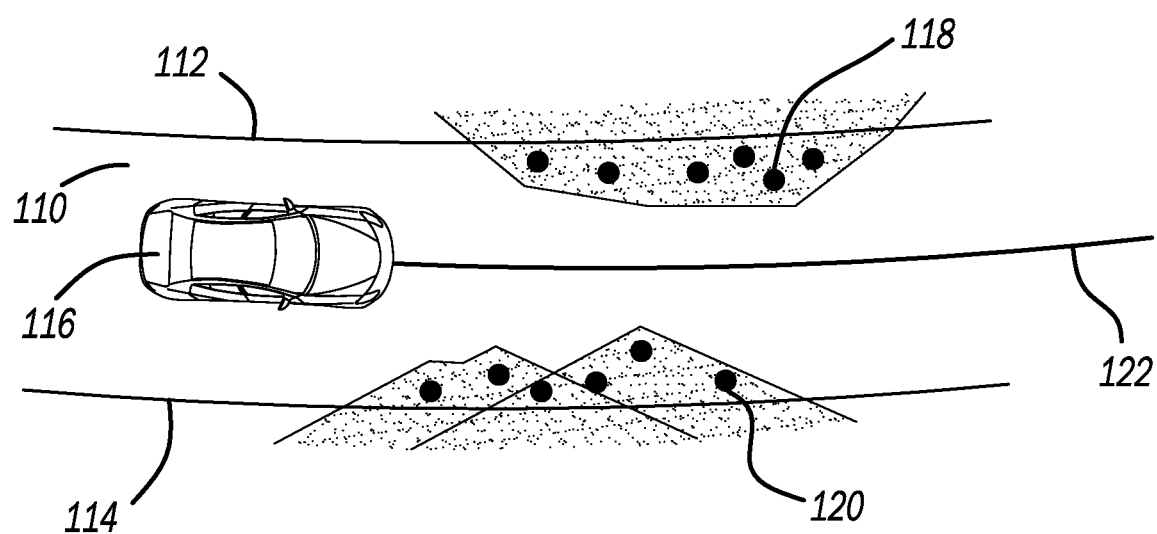
FIG. 1 illustrates an example of a vehicle traveling on a roadway and a target path.

Referring to FIG. 1, in an effort to better understand the system and method, a few brief examples will be provided to explain the benefits of the system and method. FIG. 1 illustrates a roadway 110. The roadway 110 is bounded by a left boundary 112 and a right boundary 114. The boundaries 112 and 114 essentially define the constraint in which a vehicle 116 can travel. In this example, the roadway 110 has some objects located thereon between the left boundary 112 and the right boundary 114. For example, there is a left obstacle 118 and a right obstacle 120 that encroach into the roadway 110 from the left boundary 112 and the right boundary 114, respectively. Additionally or alternatively, the left boundary 112 and/or the right boundary 114 may be an actual physical boundary, such as a barrier, ditch, and the like or could be a boundary defined by a demarcation created by lane boundaries or could be artificial boundaries created internally by the system.

As such, the target path 122 taken by the vehicle 116 must be such that is able to not only operate within the roadway 110 but to also take into account the left boundary 112 and the right boundary 114 and any obstacles, such as the left obstacle 118 and the right obstacle 120 and proceed along the target path 122 such that it does not come into contact with any of the obstacles 118 and/or 120 or go outside of the boundaries 112 and 114.

Therefore, the target path 122 taken by the vehicle should not only be able to travel within these constraints but be able to do so in a way that is pleasing to the driver and/or occupant of the vehicle 116. For example, most drivers and/or occupants do not enjoy situations where the vehicle suddenly juts in one direction or another to avoid the boundaries 112 or 114 and/or the obstacles 118 or 120. As such, in the paragraphs that follow, a system and method will be disclosed for optimizing a target path traveled by a vehicle.

Figure 2A:
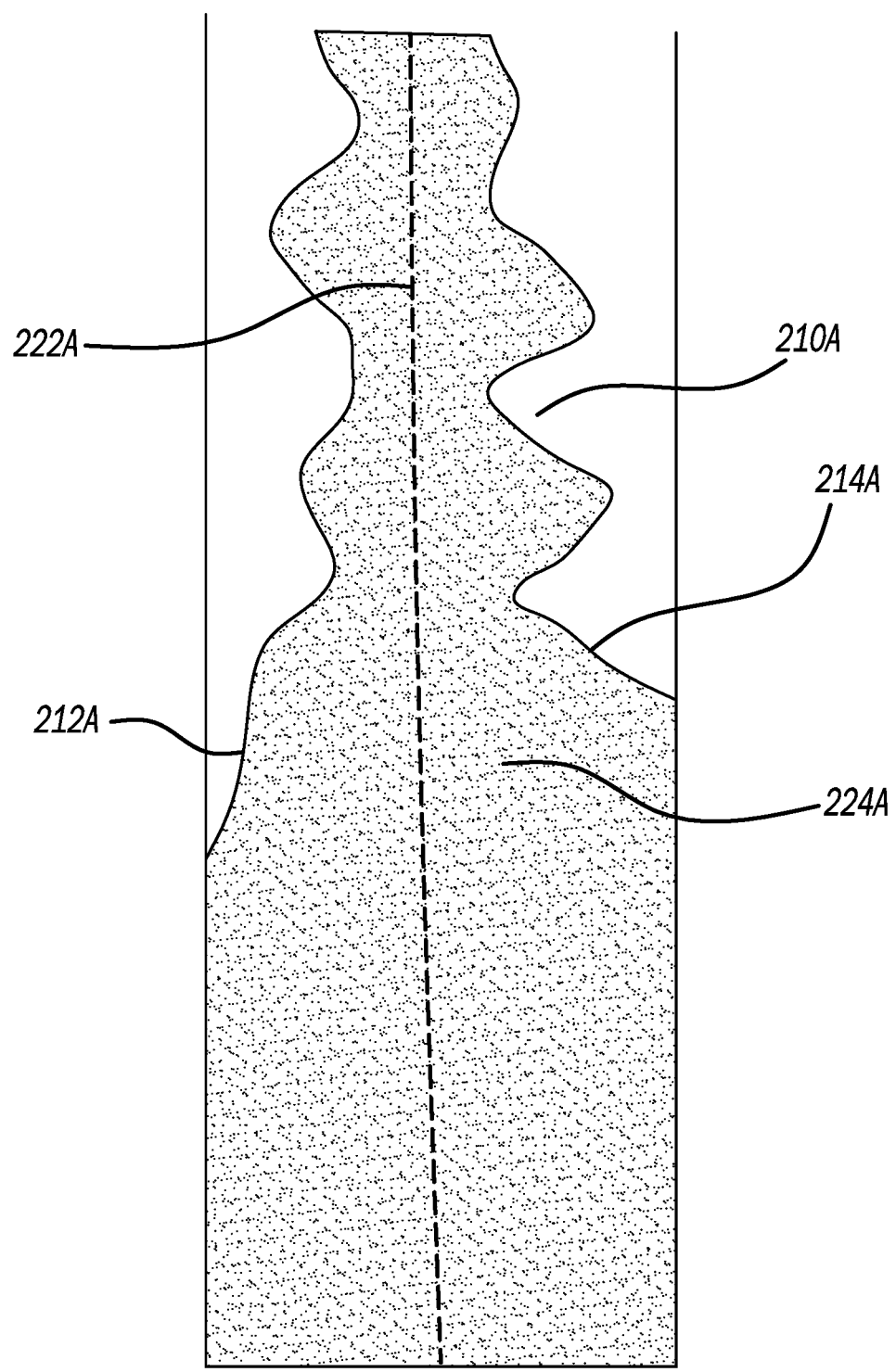
FIGS. 2A-2D illustrates examples of a vehicle traveling on different types of roadway as well as target paths for each different type of roadway.

FIGS. 2A-2D illustrate three common roadway situations encountered by vehicles. When referring to any of the figures in this specification, it should be noted like numerals will be utilized to refer to like elements, with the exception that the numerals will be increased by 100 and could be provided with an alphabetical suffix if such a suffix exists in the figure name. So, for example, the target path 122 of FIG. 1, will be referred to as the target path 222A for FIG. 2A. In FIG. 3, the target path will be referred to as the target path 322. This numbering convention continues throughout this specification FIG. 2A illustrates a road 210A having left boundary 212A and a right boundary 214A. Additionally, this figure discloses a drivable area 224A that is somewhat unsmooth and decreases in size from the bottom to the top of this figure.

Figure 2B:
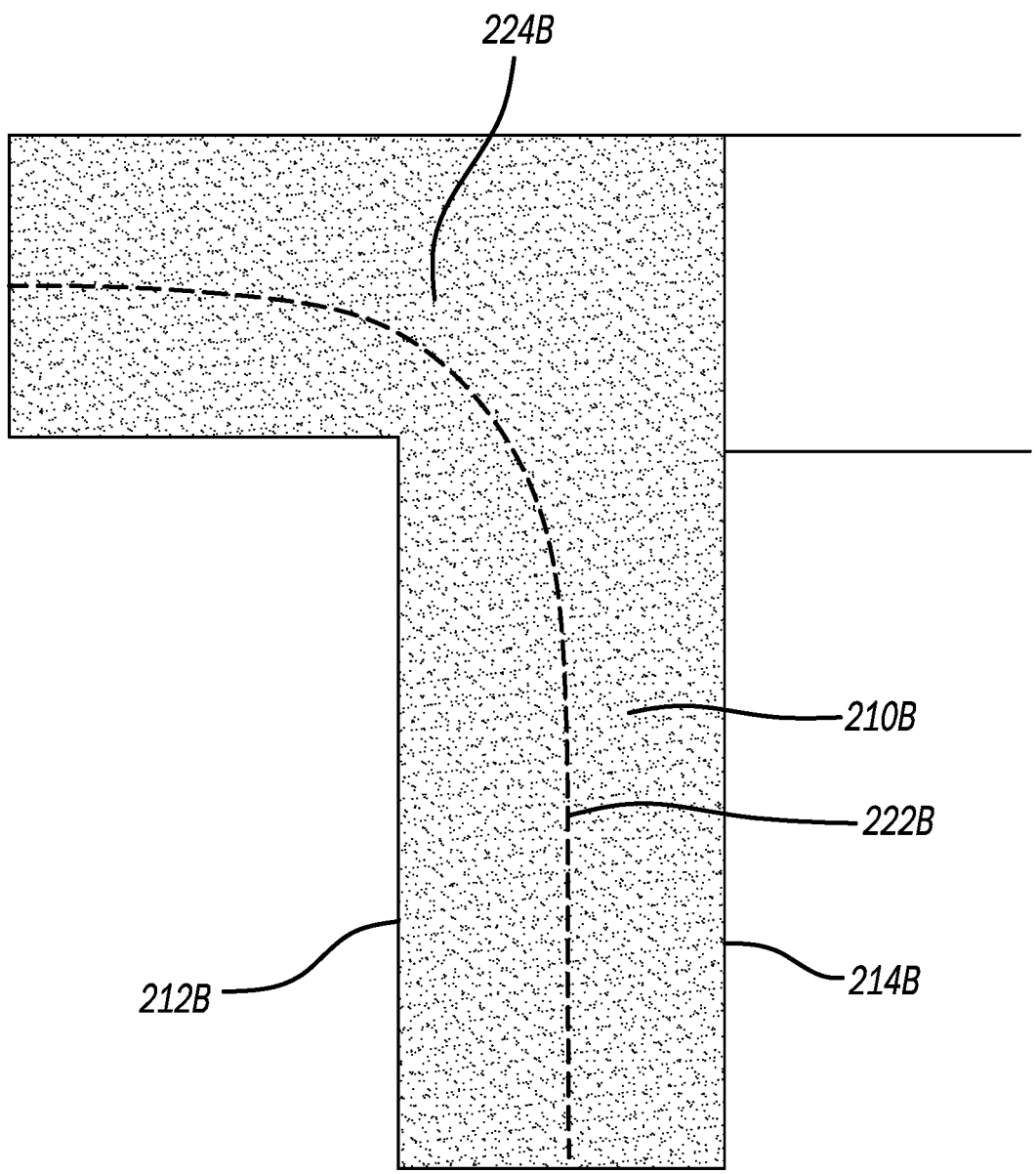
Figure 3:
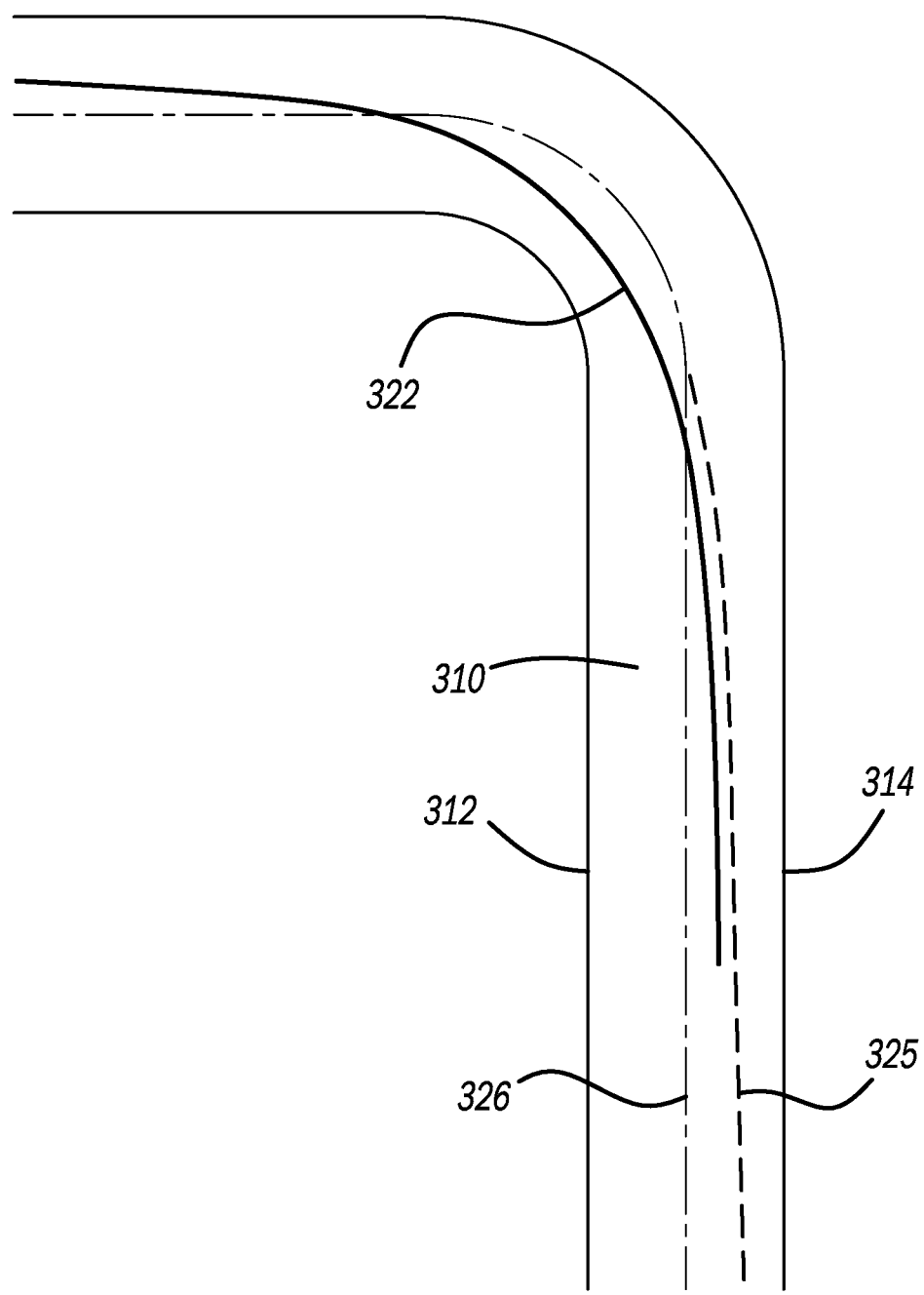
FIG. 3 illustrates another example of how a target path is optimized.

Referring to FIG. 2B, another common roadway situation is shown. Here, the roadway situation involves a T shaped intersection. Like before, the roadway 210B includes a left boundary 212D and a right boundary 214C. The drivable area 224B as can be seen in this figure is substantially "L" shaped in that it involves turning the vehicle from one road to another road.

Figure 2C:
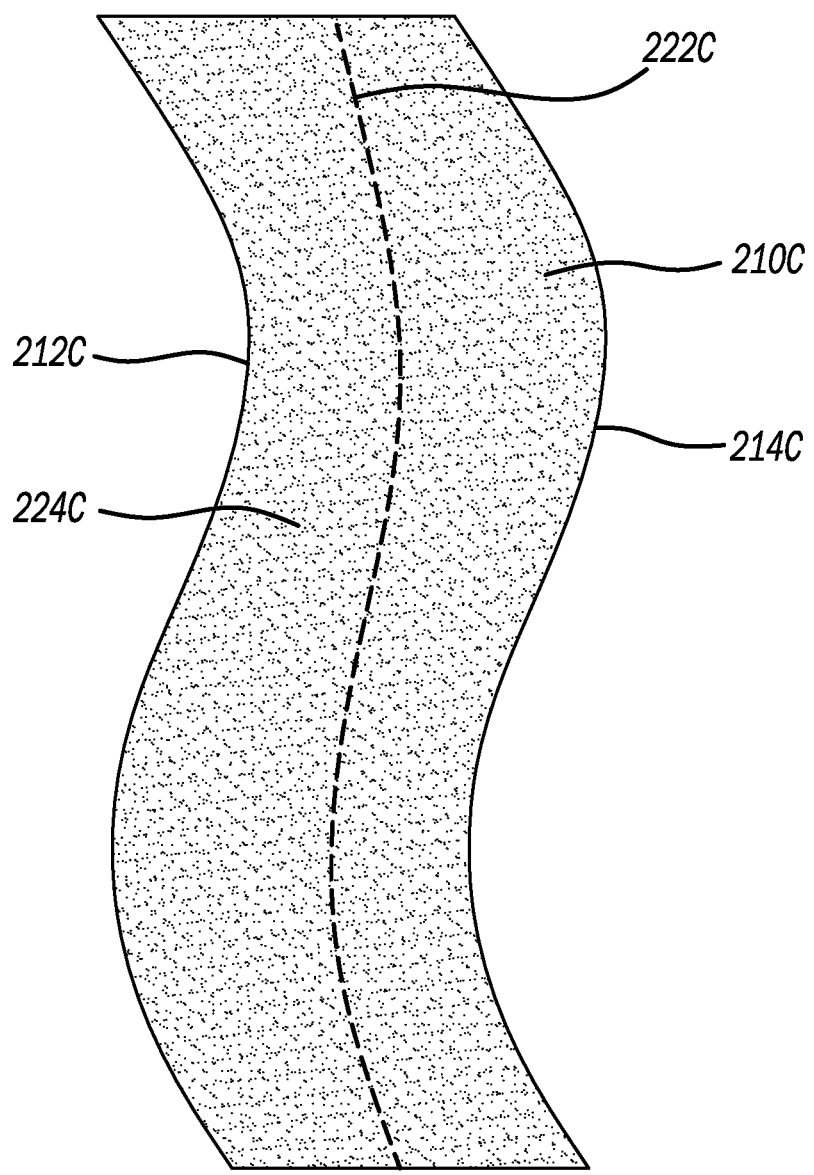

Another common situation vehicles encounter on roadways is illustrated in FIG. 2C. Here, the roadway 210C, like the other roadways, includes a left boundary 212C and a right boundary 214C. The roadway 210C is generally curvy and thus has a drivable area 224C that is also curvy in nature.

Figure 2D:
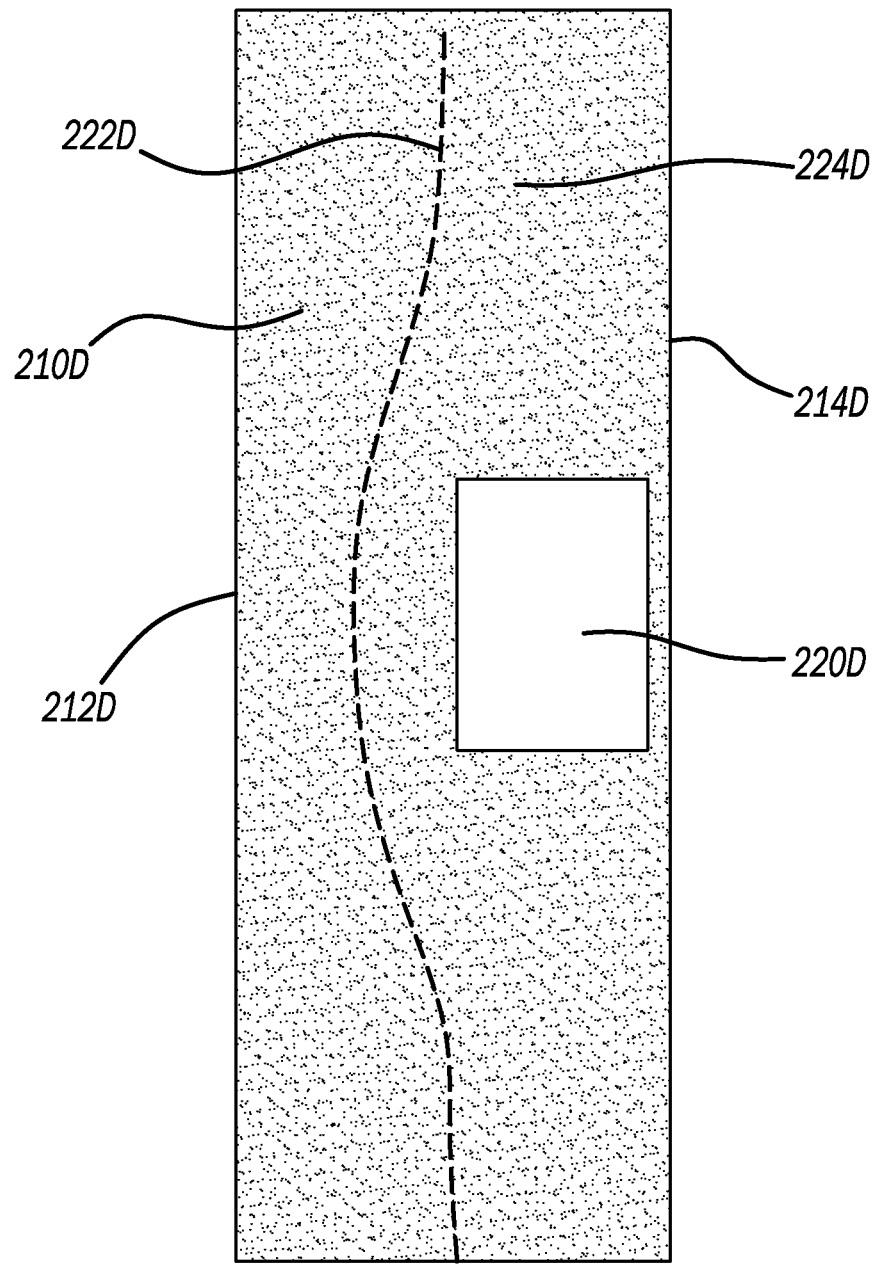

Still yet another common situation vehicles encounter on roadways is illustrated in FIG. 2D. Here, the roadway 210D, like the other roadways, includes a left boundary 212D and a right boundary 214D. However, located between the left boundary 212D and the right boundary 214D is an object 220D. It should be understood that while this example illustrates the entirety of the object 220D is located between the left boundary 212D and the right boundary 214D, there may be scenarios where only part of the object 220D is located between the left boundary 212D and the right boundary 214D. The object 220D may be any type of object, such as parked and/or disabled vehicle.

Each of the FIGS. 2A-2D show a target path 222A-222D for the vehicle to travel. The system and method described in the paragraphs that follow essentially optimize the target paths 222A-222D to make the target path as smooth as possible, thus maximizing the enjoyment to any occupants located within the vehicle. As stated earlier, occupants of vehicles generally do not like situations where the vehicle juts suddenly to avoid obstacles or to remain within the drivable area. For example, in FIG. 2C, the roadway 210C and the drivable area 224C is very curvy. However, the target path 222C taken by the vehicle is less curvy than the roadway 210C or the drivable area 224C. Again, this is due to the optimization of the target path 222C. In FIG. 2D, the target path 222D is such that it smoothly navigates around the object 220D so as to avoid any contact with the object 220D.

Referring to FIG. 3, illustrates another example of how a target path is optimized. Like before, the roadway 310 has a left boundary 312 and a right boundary 314. As such, these boundaries define the drivable area 324 in which the vehicle may travel. Here are shown three separate target paths. The first reference path 326 is essentially a simplistic target path wherein the vehicle simply proceeds along the drivable area and makes a sharp right turn. As stated before, sharp turns are generally not desirable to occupants located within the vehicle.

However, the system and method disclosed in this specification is able to optimize the reference path 326. As such, path 325 could be an originally optimized version of the path 326. Additionally, as will be explained later in this specification, the methodology for optimizing the target path works iteratively, so that the target path may be updated accordingly and iteratively. Therefore, the target path 322 shows the most optimized, or current target path of the reference path 324 and the old target path 325, wherein the current optimized target path 322 is generally fairly smooth in comparison to the other paths 325 and 326.

Figure 4:
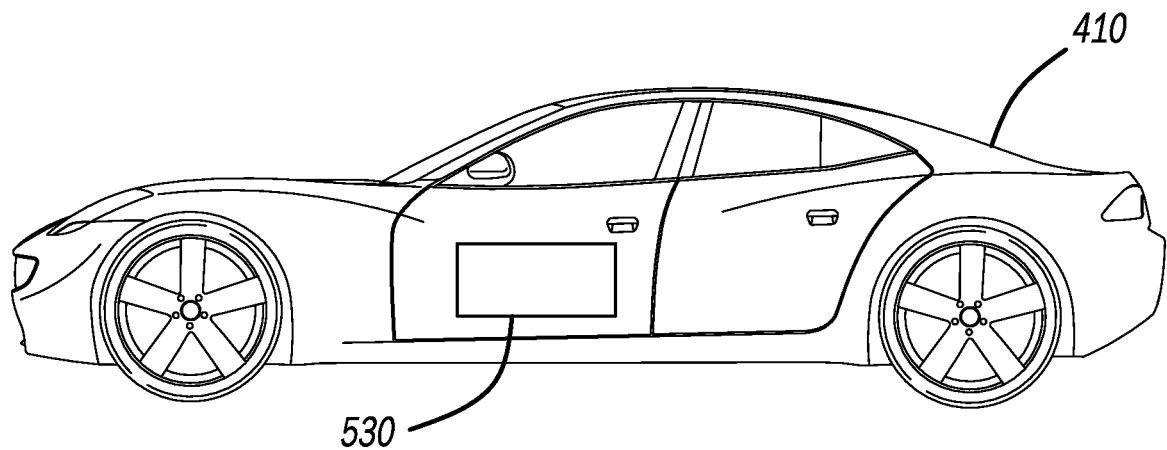
FIG. 4 illustrates a vehicle, in this case, an automobile, having the system for determining a target path for the vehicle.
Figure 5:
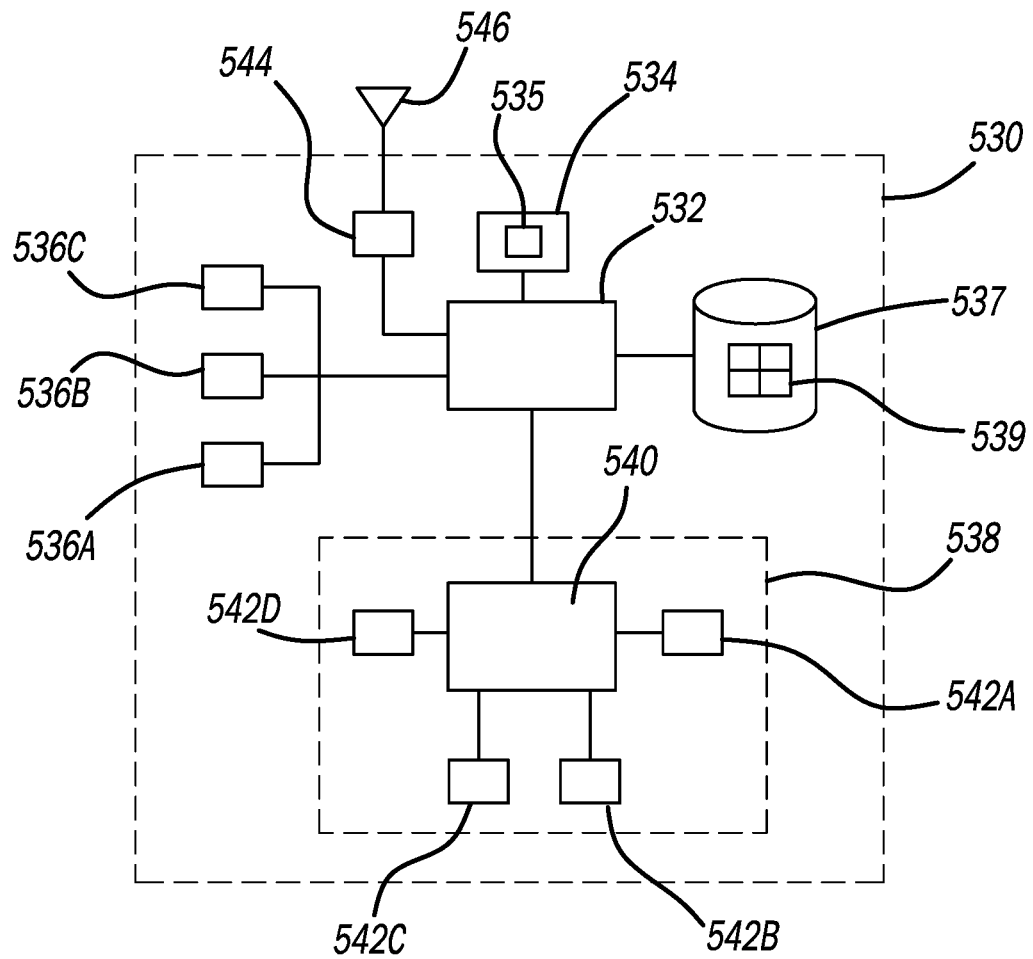
FIG. 5 illustrates a block diagram of the system for determining a target path for a vehicle.

Referring to FIGS. 4 and 5, the system for optimizing the target path will be described in more detail. Referring to FIG. 4, a vehicle 410 is shown. It should be understood that the vehicle 410 may be any vehicle capable of traveling from one place to another. As such, the vehicle may be an automobile, as shown, or may be any other type of vehicle, such as light or heavy-duty trucks, mining vehicles, farming tractors, construction-related vehicles, and the like. Furthermore, it should be understood that vehicle may not only refer to land-based vehicles but could refer to vehicles that travel through other mediums, such as air or water, such as boats and airplanes. Here, the vehicle 410 is shown to contain the system 430, which is shown in more detail in FIG. 5.

The system 530 includes a processor 532. The processor 532 may be a single processor or may be a plurality of processors working in concert. In communication with the processor 532 is a memory device 534. The memory device 534 may be any memory device capable of storing digital information, such as solid-state memory devices, magnetic memory devices, optical memory devices, and the like. Further, it should be understood that while this figure shows the memory device 534 separate from the processor 532, it is completely possible for the memory device 534 to be incorporated within the processor 532. Additionally, the memory device 534 may not be a single memory device but may be multiple memory devices of the same or different types working in concert to store digital information.

Located within the memory device 534 are instructions 535. These instructions 535 configure the processor 532 to perform any one of a number of different methods disclosed in this specification.

The processor 532 may also be in communication with a database 537. Like the memory device 534, the database 537 may be any type of database capable of storing digital information. As such, the database could be as simple as any memory device previously disclosed or may be multiple memory devices working in concert to store information. Additionally, it should be understood that while the database 537 has been shown to be incorporated within the system 530, it is possible that the database 537 be located remote from the system 530 such that the processor 532 communicates with the database 537 using any one of a number of different methodologies for transmitting digital information. So, for example, the processor 532 may be a wireless communication with the database 537, which could be stored in completely separate location from the vehicle 410 of FIG. 4.

Stored within the database 537 is an electronic map 539. The electronic map 539 is generally a map of one or more roadways in which the vehicle 410 may travel on. The map 539 may be a high definition map. A high definition map may have extremely high precision geographic details at centimeter level, or even more precise, accuracy. These high definition maps greatly assist the autonomous nature of the vehicle 410 because the high definition map provides significant detail regarding the roadway in which the vehicle will travel on. This information includes very precise physical information regarding the roadway including the size of the roadway, any known obstacles located within the roadway, and other information.

The processor 532 may also be in communication with sensors 536A-536C. The sensors 536A-536C may be located within the system 530 or may be located outside the system but generally within the vehicle 410. The purpose of the sensors 536A-536C is to obtain additional information regarding the environment in which the vehicle 410 is located within. For example, the sensor 536A may be an ultrasonic sensor capable of detecting objects using ultrasonic waves. Sensor 536B may be a camera system that includes one or more cameras for capturing visual data concerning the environment in which the vehicle 410 operates within. Sensor 536C could be an advanced LIDAR system. Each of these sensors 536A, 536B, and/or 536C may be mounted to the vehicle 410 so as to collect appropriate information. This LIDAR systems may be able to measure the distance from the vehicle to one or more targets by illuminating the targets with a pulsed laser light and measuring the reflected pulses with a sensor. Differences in laser return times and wavelengths can then be used to make digital 3D representation of the targets. Of course, it should be understood that the sensors 536A-536C could include one or more sensors capable of detecting objects or peculiarities in which in the environment in which the vehicle 410 operates.

The processor 532 may also be in communication with the vehicle control system 538. The vehicle control system 538 may be located within the system 530 or may be located separately from the system 530 but generally within the vehicle 410. The vehicle control system 538 also includes a processor 540, which may be one or more processors working in concert. The processor 540 is in communication with any one of a number of different vehicle subsystems 542A-542D. These vehicle subsystems 542A-542D generally control the movement of the vehicle 410.

For example, the vehicle subsystem 542A may relate to the steering of the vehicle 410. The vehicle subsystem 542B, may relate to the accelerator of the vehicle allowing the vehicle to propel either forward or backwards. The vehicle subsystem 542C may be related to the braking system of the vehicle thereby allowing the vehicle 410 to stop. As to the vehicle subsystem 542D, this system may be related to the powertrain of the vehicle allowing the vehicle to shift into different gears so as to allow the vehicle to travel either forward or backwards.

The vehicle subsystems 542A-542D are simply examples of different vehicle subsystems that may be controlled by the vehicle controller system 538. As such, there may be more subsystems or different subsystems that could be controlled by the vehicle control system 538. In either case, the purpose of the vehicle subsystem 538 is to control the movement of the vehicle 410. As such, any one of the previously mentioned or additional or alternative subsystems may be utilized by the vehicle control subsystem 538.

The processor 532 may also be in communication with a GPS system, such as GPS system 544. The GPS system 544 is also connected to an antenna 546 which, based upon communication with or more GPS satellites, is able to provide information to the GPS device 544 regarding the position of a vehicle 410. This information could be utilized with high definition map information 539 and information collected from other sensors such as the sensors 536A-536C or other sensors to provide exact position of the vehicle 410 on the roadway and within the environment in which the vehicle operates within.

Figure 6:
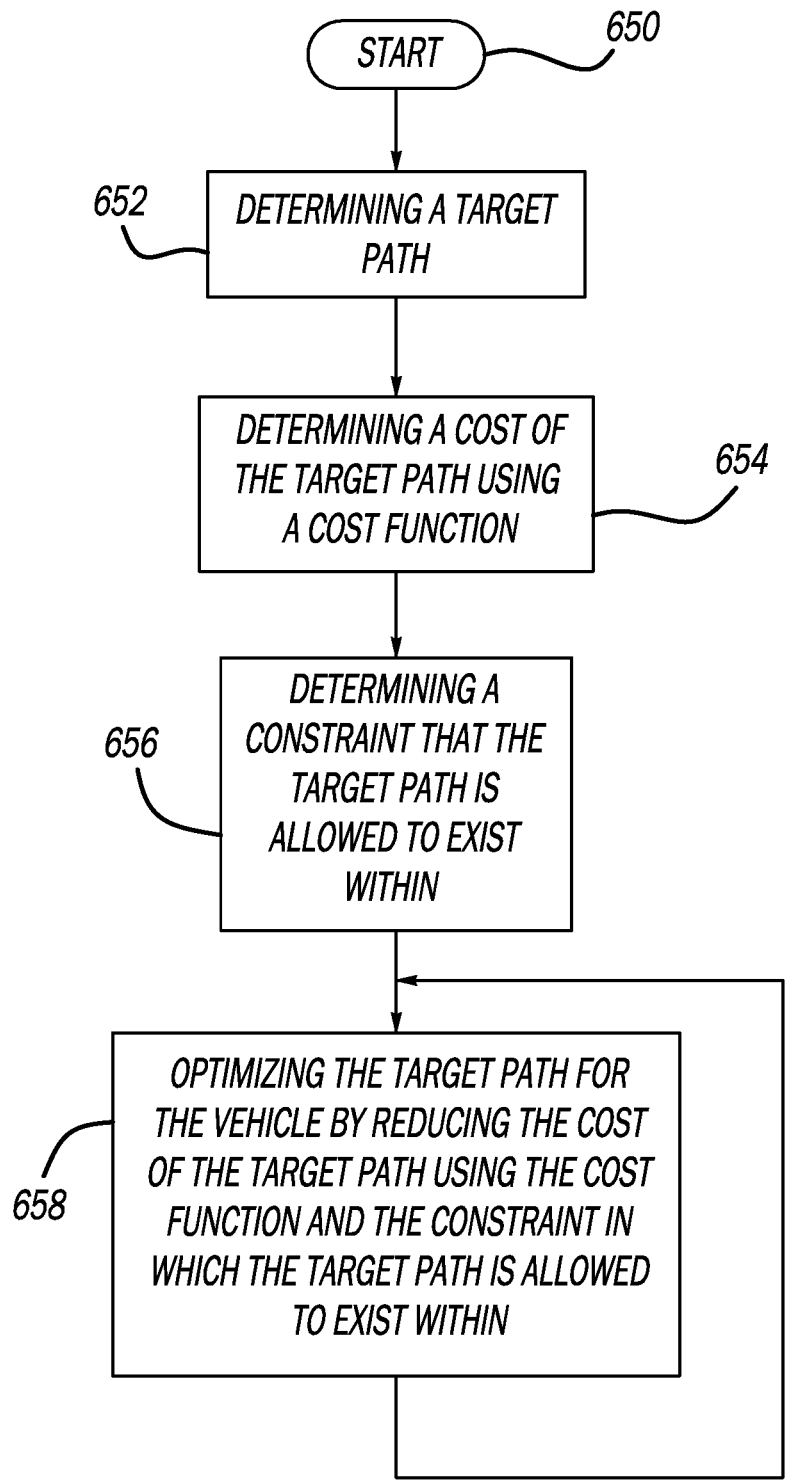
FIG. 6 illustrates a method for determining a target path for a vehicle.

Referring to FIG. 6, a block diagram of the method 600 for determining a target path of the vehicle is shown. It should be understood that this method may be executed by the processor 532 of FIG. 5. Additionally, it should be understood that this method may be included with the instructions 535 stored within the memory device 534.

The following description of the method 600 will first begin by providing a brief overview of each of the steps within the method 600. Thereafter, a more detailed explanation of what is encompassed in each of the steps will be described.

The method 600 starts at block 650. In step 652, the method 600 first determines a target path. Generally, the target path substantially follows a direction the vehicle intends to travel as stated in the paragraphs above. In step 654, a determination will be made regarding a cost of the target path using a cost function. As will be described in greater detail below, several different criteria may be utilized by the cost function. In its most basic form, the cost function utilizes a criterion that comprises a smoothness of the target path.

In step 656, a determination will be made regarding the constraint that the target path is allowed to exist within. Generally, the constraint is a distance from a reference point on the target path to a right boundary and a left boundary, wherein the distance is substantially perpendicular to the target path at the reference point. However, other constraints may also be utilized as will be described below in greater detail.

In step 658, the target path for the vehicle is optimized. The target path is based on reducing the cost of the target path using the cost function and the constraint in which the target path is allowed to exist within. This step may be done in an iterative fashion. As such, step 658 may be executed numerous times so as to reduce the cost function and thereby increase the smoothness of the target path with each iteration.

Figure 7:
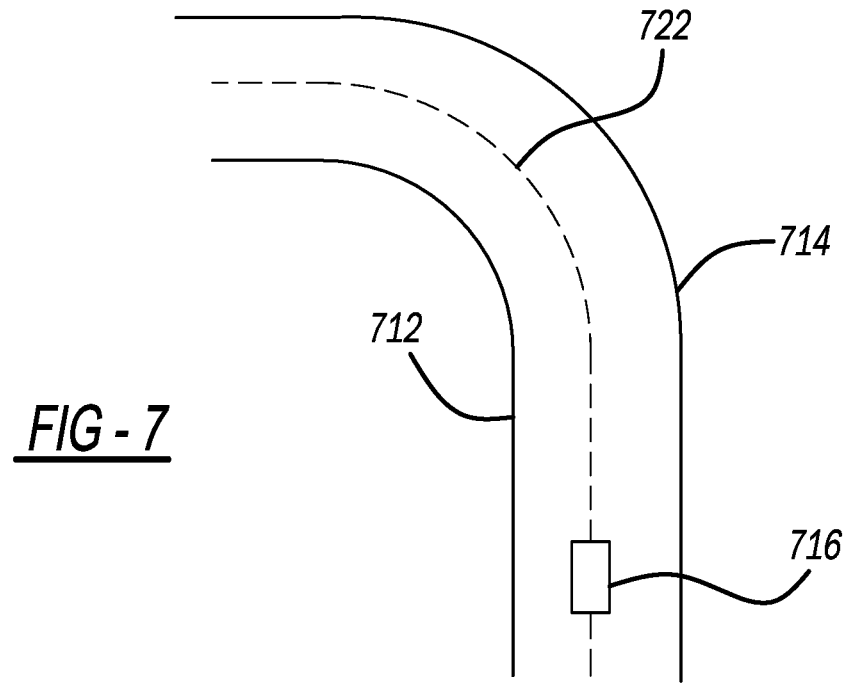
FIGS. 7 and 8 illustrate examples of the method of FIG. 6.
Figure 8:
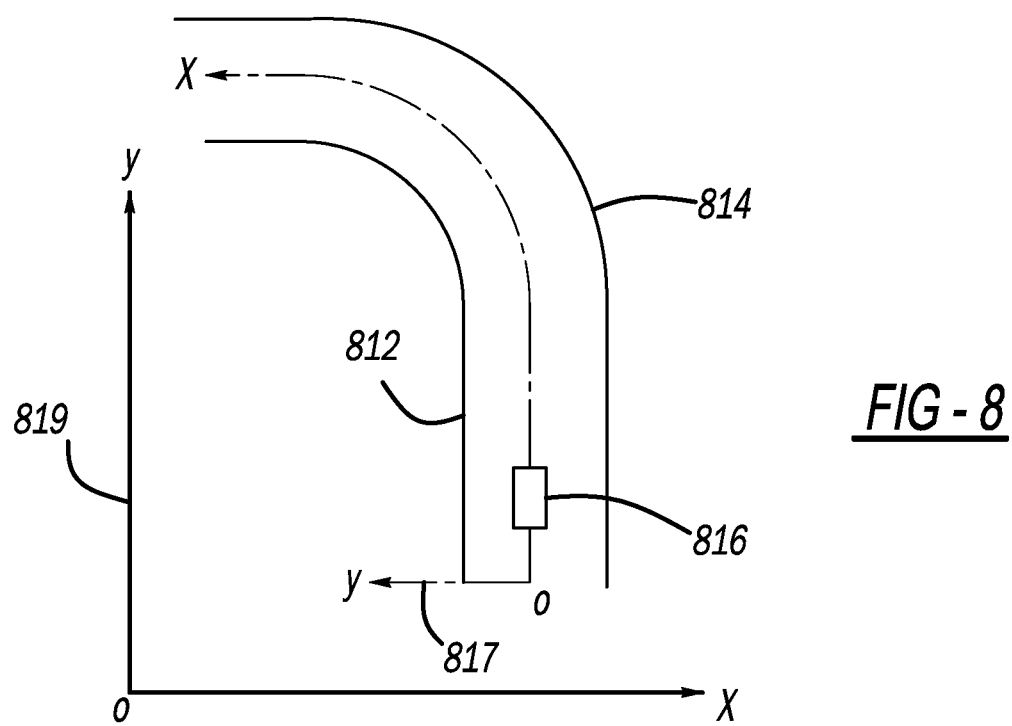
Figure 9:
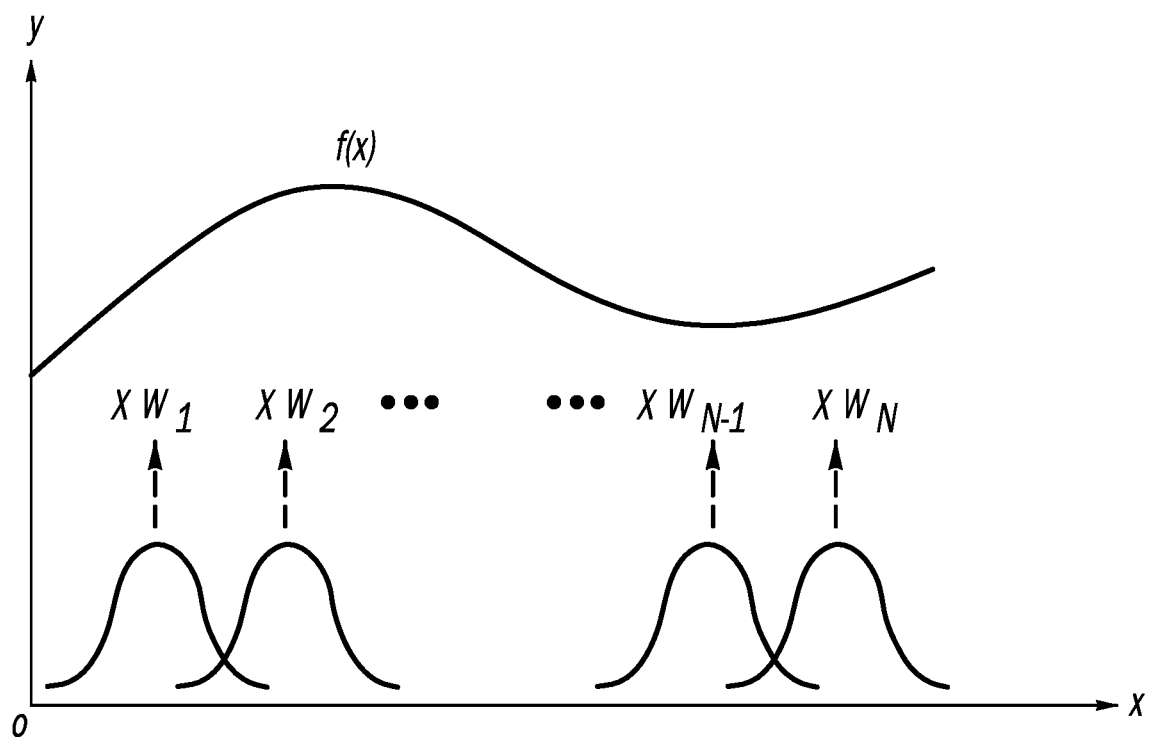
FIG. 9 illustrates weight coefficients for each basis function for determining a target path for a vehicle.

As to the specific details of each of the steps, the step 652 of determining the target path will make reference to FIGS. 7-9. FIG. 7 illustrates a typical locational relationship among a left boundary 712, a right boundary 714 and the target path 722. At this point, the target path may only be required to indicate rough direction of travel and does not have to be exact center of the lane. In implementation, the target path may be adopted from nominal lane center that a high definition map provides, or it may be computed from lane boundaries 712 and 714 that will be described later.

As best shown in FIG. 8, defining a starting point of the target path 722 as origin of the axis, one can define a local coordinate system 817. This local coordinate system 817 may be later converted to a global coordinate system 819.

In the local coordinate system, the target path 822 that is to be optimized is expressed as, $$f(x) = \sum_{j=1}^{M} w_j \phi_j(x)$$

where $\phi_j(x)$ represents a basis function, $w_j$ represents weight coefficient for each basis function, as best shown in FIG. 9. Every member of basis functions $\phi_j(x)$ (j=1, 2 . . . M) is linearly independent on each other. Basis function(s) may be chosen from variety of nonlinear functions, with typical choice being a type of function that is comprised of Gaussian functions, or a class of sigmoid functions.

For the sake of implementation the function is desired to be discretized with a certain interval. It may be uniform or non-uniform interval. When the function is discretized, the above quadratic expression can be generally written by matrix representation. When we define descretized function value $f(x_t)$, at sample $x_t$ (t=1, 2 . . . N), $$F = HW$$

where W is a vector containing of weight coefficients, and F is a vector containing descretized function values.

$$W = [w_1, w_2, \ldots, w_M]^T,$$

$$F = [f(x_1), f(x_2), \ldots, f(x_N)]^T$$

H is a matrix consisting of basis functions, whose element is defined as $$H_{(i,j)} = [\phi_j(x_t)]$$

As stated above, in step 654, a cost is determined of the target path using a cost function. In automated driving in an urban environment, for example, one may consider a cost function to evaluate smoothness of the target path. When we take overall curvature of the path as an index for mathematically evaluating the smoothness, the cost function is derived as:

$$J^0 = \sum_{t=1}^{N} \{\kappa_{ref}(x_t) + \kappa_{path}(x_t)\}^2$$

where is $\kappa_{ref}$ is curvature of the reference path, and $\kappa_{path}$ is curvature of the target path in the local coordinate system. The curvature of the target path can be approximated by second derivative of the function. Furthermore, utilizing linearity of the function that is employed in this device, curvature of the target path is expressed as $$\kappa_{path}(x) \approx \frac{d^2 f(x)}{dx^2} = \sum_{j=1}^{M} w_j \frac{d^2 \phi(x)}{dx^2}$$

Since the above equation is linear, curvature of the target path in discretized format is written as $$K_{path} \approx H_{dd} W$$

where $K_{path} = [\kappa_{path}(x_1), \kappa_{path}(x_2), \ldots, \kappa_{path}(x_N)]^T$, and matrix $H_{dd}$ is second derivative of matrix H whose element is specifically, $$H_{dd(i,j)} = \left[\frac{d^2 \phi_j(x_i)}{dx^2}\right]$$

Based on above derivations, we get approximated cost function J.

$$J = \sum_{i=1}^{N} \left\{\kappa_{ref}(x_i) + \sum_{j=1}^{M} w_j \frac{\phi_j^2(x_t)}{dx^2}\right\}^2$$

One can rewrite this quadratic form with matrix representation as follows.

$$J = [K_{ref} + H_{dd}W]^T[K_{ref} + H_{dd}W] = W^T H_{dd}^T H_{dd} W + 2K_{ref}^T H_{dd} W + K_{ref}^T K_{ref}$$

Therefore, we obtain cost function, $$J = W^T Q W + C^T W + \text{const}$$

with notation of matrix Q and C, $$Q = H_{dd}^T H_{dd}$$

$$C = 2 H_{dd}^T K_{ref}$$

"Const" means a constant and in this case, this term does not have any effect for cost function in optimization problem. In each computation step, the value of Q and C above are computed and stored to memory for the optimization of next step.

Figure 10A:
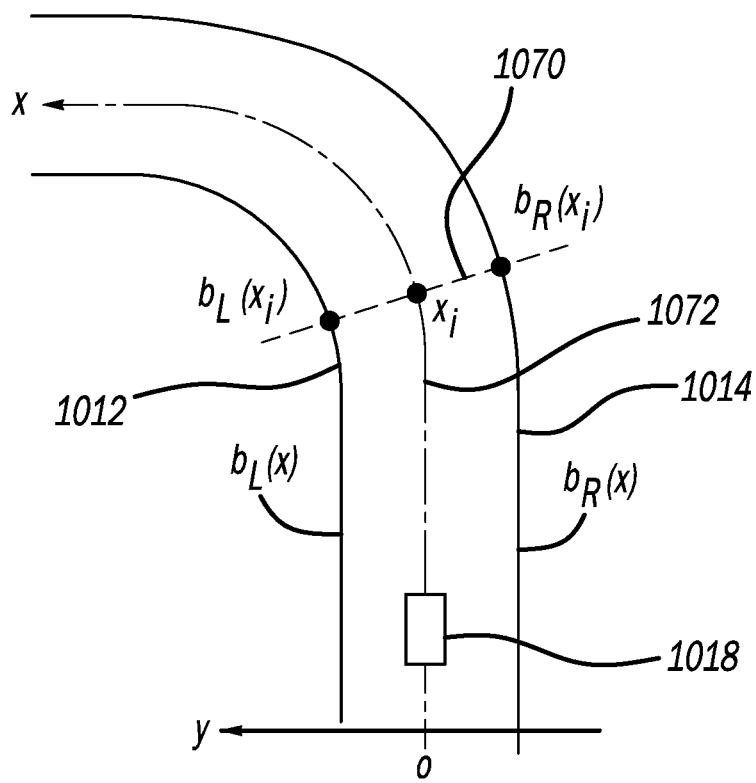
FIGS. 10A and 10B illustrate examples of determining a constraint in which a vehicle is allowed to operate within.
Figure 10B:
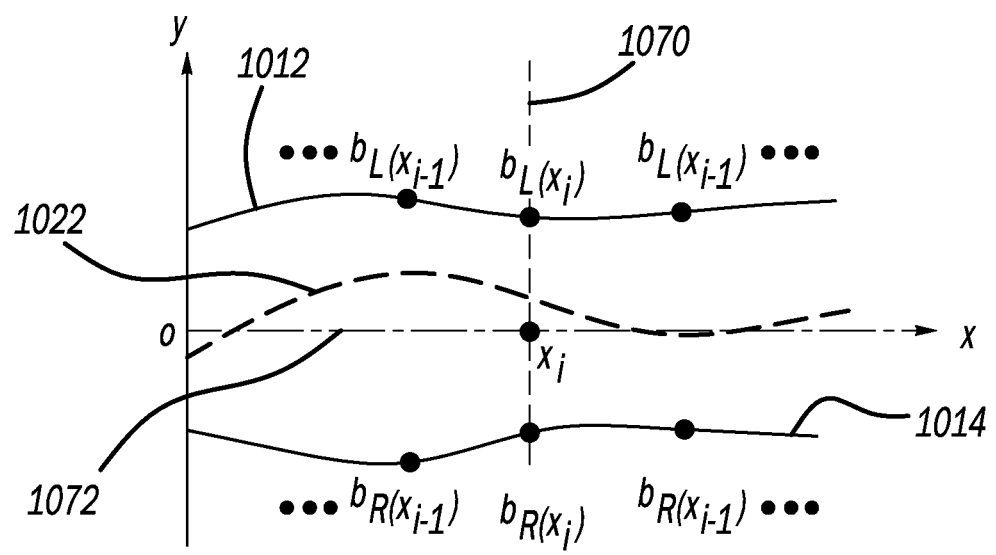

In step 656 the constraint(s) is (are) determined. The constraint is the area within which the target path is allowed to exist. For example, referring to FIGS. 10A and 10B, these figures illustrates a vehicle 1016 located on a roadway between a left boundary 1012 in a right boundary 1014. Here, this step may find a projected distance 1070 of the of the left boundary 1012 and the right boundary 1014 from a reference path 1072. In other words, it finds distance from each sampled point on the reference path 1072 to the left boundary 1012 and the right boundary 1014, where the distance is measured perpendicular to the reference path 1072. The distances at each sampled point $x_i$ of reference path 1072 corresponds to the constraint imposed to the target path 1022 in the local coordinate system.

Mathematically, the relationship is written:

$$B_{R(t)} \leq f(x_i) \leq B_{L(t)} (i=1,2 \ldots N)$$

where $B_{L(t)}$ and $B_{(t)}$ represent boundaries of drivable area:

$$B_L = [b_L(x_1), b_L(x_2), \ldots, b_L(x_N)]^T,$$

$$B_R = [b_R(x_1), b_R(x_2), \ldots, b_R(x_N)]^T.$$

Because of linearity of the employed function, this is further written $$AW \leq B$$

where A, B are defined as $$A = \begin{bmatrix} H \\ -H \end{bmatrix}, \text{ and}$$

$$B = \begin{bmatrix} B_L \\ -B_R \end{bmatrix}.$$

In each computation step, the value of A and B above are computed and stored to memory for the optimization step.

Note that Q matrix does not change under condition that the length of the reference path and sampling interval are kept unchanged for every computation event. In this case of implementation, value of Q can be stored in memory for repetitive use, and does not need to be computed in each computation event.

It should be understood that the constraint may be based on information from a variety of different sources. In this step, the location and geometry of lane boundaries are derived from the high definition map. In this case, the system and method generates target path that allows the vehicle to drive within nominal lane boundaries.

However, the constraint may also consider other constraints, such as obstacles located in a roadway. To generate target path that responds to obstacles around the vehicle, information about detected obstacles from equipped sensors are combined with lane boundaries from hi-definition map. In a typical system of automated driving vehicle, obstacle information is available as a form of object list that provides the size, type, location, and speed of detected obstacles. The object list is often produced by fusing signals from various sensors such as radars, cameras, and LIDAR that are equipped to detect the environment around the vehicle.

For example, FIG. 11A presents a scenario where an obstacle 1174 is detected on the right side of the lane. Here, the vehicle 1116 is traveling on a roadway having a left boundary 1112 and a right boundary 1114. The obstacle 1174 is protruding from the right boundary 1114. In actual traffic conditions, the obstacle 1174 corresponds to a parked vehicle, a bicycle, or a pedestrian walking along the roadside. Static lane boundaries in the figure are given by hi-definition map, for example.

FIG. 11B illustrates formation of effective lane boundaries. It depicts that effective lane boundary on the right side is created by combining the circumference of the obstacle and nominal right lane boundary. Knowledge of circumference and location of the obstacle is obtained from the object list. Effective lane boundary on the left side is identical to its static boundary in this example since no obstacle is present on the left. The effective lane boundaries are defined as constraint in optimization of the target path carried out in step 658.

FIG. 11C shows resulting optimized target path 1122. It is ensured that optimized target path 1122 avoids the obstacle 1174 since the obstacle 1174 is incorporated in the constraint of the optimization. As such, the system and method, is able to systematically generate target 1122 path that evades obstacles 1174 while retaining its smoothness. It does not require additional computation resources in handling obstacles 1174 since the procedure only modifies the way to formulate constraint for optimization.

As stated before, in step 658, the target path is optimized. The optimization is carried out on the problem formulation:

Minimize: $j = W^T QW + C^T W + \text{const},$

Subject to: $AW \leq B$

In the formulation, sets of Q, C and A, B are provided from steps 654 and 656, respectively. The objective is to find the weigh vector of W which minimizes the cost function while satisfying the non-equality equation. The problem takes a form of quadratic programming which can be solved with a generic algorithm.

Number of parameters to optimize is the number of elements stored in W. The number of parameters is significantly smaller than the number of point sequence making up the target path $f(x_t)$. Since number of parameters to be optimized is the major determining factor on computation load, we can greatly reduce the computation load in this device as opposed to the case of optimizing point sequence of the target path directly.

Figure 12A:
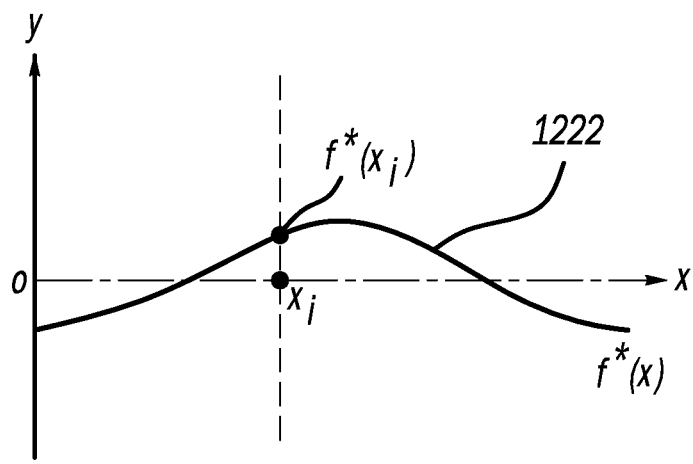
FIGS. 12A-12B illustrate examples of converting a target path from a local coordinate system to a global coordinate system.
Figure 12B:
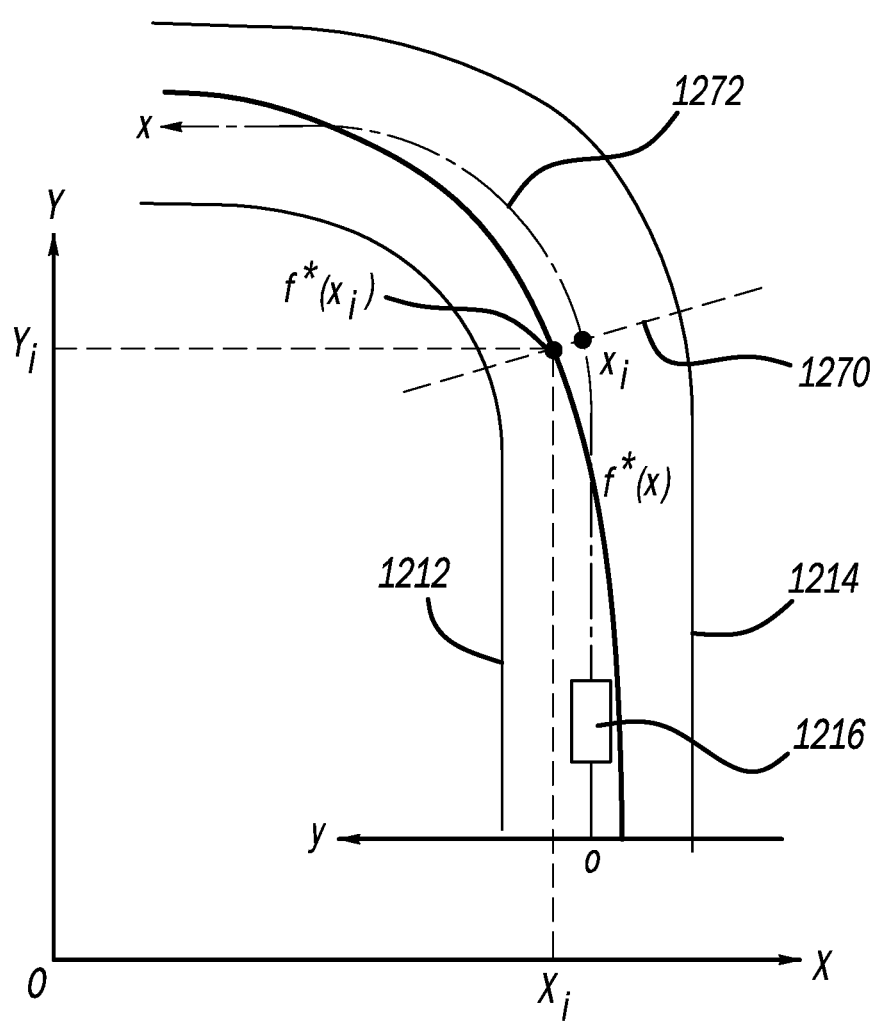

In addition to the steps mentioned above and shown in FIG. 6, there may be an additional step regarding transferring the optimized target path from a local coordinate system (x,y) to a global coordinate system (X, Y). Moreover, as best shown in FIGS. 12A and 12B. An optimized target path 1222 is shown. As best shown in FIG. 12A, this optimized target path 1222 is defined using a local coordinate system (x, y).

FIG. 12B again shows the optimized target path 1222, as well as the vehicle 1216. The vehicle 1216 is traveling on a roadway defined between the left boundary 1212 in the right boundary 1214. Here, both coordinate systems—the local coordinate system (x, y) and a global coordinate system (X, Y) are shown together.

This conversion from the local coordinate system to the global coordinate system involves utilizing and optimized weight vector denoted W*, we obtain point sequence of optimal target path F*.

$$F^* = HW^*$$

Reminded that this is a discrete values of the optimal target path, $$F^* = [f^*(x_1), f^*(x_2), \ldots, f^*(x_N)]^T.$$

In order to find the target path 1122 in global coordinate system one may put an offset on the reference path by the amount of $f^*(x_t)$. Then, the target path 1222 in global coordinate system $P(X_t, Y_t)$ (i=1, 2 . . . , N) is found by measuring the position of this point in global coordinates. Finally, the target path in global coordinate system is transmitted to a functionality that is responsible for realizing the motion by following the target path.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A method for generating a target path for a vehicle, the method comprising the steps of:
    determining a target path, the target path substantially follows a direction the vehicle intends to travel;
    determining a cost of the target path using a cost function, wherein the cost function utilizes a criteria that comprises a smoothness of the target path;
    determining a constraint that the target path is allowed to exist within, wherein the constraint is a distance from a reference point on the target path to a right boundary and a left boundary, wherein the distance is substantially perpendicular to the target path at the reference point; and
    optimizing the target path for the vehicle, wherein the optimized target path is based on reducing the cost of the target path using the cost function and the constraint in which the target path is allowed to exist within, wherein the cost function is derived as:

$$J^0 = \sum_{i=1}^{N} \{\kappa_{ref}(x_i) + \kappa_{path}(x_i)\}^2,$$

where $\kappa_{ref}$ is curvature of the target path, and $\kappa_{path}$ is curvature of the target path in a local coordinate system.

2. The method of claim 1, wherein the smoothness of the target path is based on the curvature of the target path.

3. The method of claim 2, wherein the criteria for the cost function further comprises closeness to a center of the target path and length of the target path.

4. The method of claim 3, wherein the cost is increased by the cost function when (a) the smoothness of the target path decreases, (b) the closeness to the center of the target path decreases, or (c) the length of the target path increases.

5. The method of claim 4, wherein the cost function weighs the criteria of the smoothness of the target path greater than the closeness to the center of the target path or the length of the target path.

6. The method of claim 1, wherein the target path is expressed as:

$$f(x) = \sum_{j=1}^{M} w_j \phi_j(x),$$

where $\phi_j(x)$ represents a basis function, $w_j$ represents weight coefficient for each basis function and wherein every member of basis functions (x) (j=1, 2 ... M) is linearly independent on each other.

7. The method of claim 1, wherein the target path is discretized at sample $x_i$ (i=1, 2 ... N), as F=HW,
    where W is a vector containing of weight coefficients, and F is a vector containing discretized function values;

$$W=[w_1, w_2, \ldots, w_M]^T;$$

$$F=[f(x_1), f(x_2), \ldots, f(x_N)]^T; \text{ and}$$

H is a matrix consisting of basis functions, whose element is defined as $H(i,j)=[\phi_j(x_i)]$.

8. The method of claim 7, wherein the curvature of the target path is expressed as:

$$\kappa_{path}(x) \approx \frac{d^2 f(x)}{dx^2} = \sum_{f=1}^{M} w_f \frac{d^2 \phi(x)}{dx^2}.$$

9. The method of claim 1, wherein the constraint comprises more than one constraint.

10. The method of claim 9, wherein the more than one constraint includes obstacles located within the right boundary and the left boundary.

11. The method of claim 1, further comprising the step of converting the target path from a local coordinate system to a global coordinate system.

12. A system for generating a target path for a vehicle and controlling the movement of the vehicle, the system comprising:
    a processor;
    a control system in communication with the processor, the control system being configured to control the movement of the vehicle;
    the processor being configured to:
        determine a target path, the target path substantially follows a direction the vehicle intends to travel,
        determine a cost of the target path using a cost function, wherein the cost function utilizes a criteria that comprises a smoothness of the target path,
        determine a constraint that the target path is allowed to exist within, wherein the constraint is a distance from a reference point on the target path to a right boundary and a left boundary, wherein the distance is substantially perpendicular to the target path at the reference point, and
        optimize the target path for the vehicle, wherein the optimized target path is based on reducing the cost of the target path using the cost function and the constraint in which the target path is allowed to exist within, wherein the criteria for the cost function further comprises closeness to a center of the target path and length of the target path, the cost function weighs the criteria of the smoothness of the target path greater than the closeness to the center of the target path or the length of the target path;
    wherein the processor is configured to instruct the control system to move the vehicle along the target path.

13. The system of claim 12, wherein the smoothness of the target path is based on the curvature of the target path.

14. The system of claim 13, wherein the cost is increased by the cost function when (a) the magnitude of the curvature of the target path increases or the change in the curvature of the target path increases, (b) the closeness to the center of the target path decreases, or (c) the length of the target path increases.

15. The system of claim 12, further comprising an electronic map in communication with the processor, wherein the target path is based on a nominal lane center from an electronic map or wherein the target path is based from lane boundaries from an electronic map.

16. The system of claim 12, further comprising at least one sensor in communication with the processor and mounted to the vehicle, the at least one sensor providing information regarding the constraint that the target path is allowed to exist within.

\* \* \* \* \*